US012718819B2

(12) United States Patent
Varshney et al.

(10) Patent No.: US 12,718,819 B2
(45) Date of Patent: Aug. 25, 2026

(54) INTERRUPTION DETECTION AND HANDLING BY DIGITAL ASSISTANTS

(71) Applicant: Adeia Guides Inc., San Jose, CA (US)

(72) Inventors: Prateek Varshney, Bangalore (IN); Madhusudhan Seetharam, Bangalore (IN); Vishwas Sharadanagar Panchaksharaiah, Tumkur District (IN)

(73) Assignee: Adeia Guides Inc., San Jose, CA (US)

( * ) Notice: Subject to any disclaimer, the term of this patent is extended or adjusted under 35 U.S.C. 154(b) by 158 days.

(21) Appl. No.: 18/650,582

(22) Filed: Apr. 30, 2024

(65) Prior Publication Data

US 2024/0386892 A1 Nov. 21, 2024

Related U.S. Application Data

(63) Continuation of application No. 16/950,397, filed on Nov. 17, 2020, now Pat. No. 12,002,471.

(51) Int. Cl.

| | |
|---|---|
| ***G10L 15/22*** | (2006.01) |
| ***G06F 16/632*** | (2019.01) |
| ***G10L 15/30*** | (2013.01) |
| ***G10L 25/51*** | (2013.01) |
| ***G10L 25/84*** | (2013.01) |

(52) U.S. Cl.

CPC .......... *G10L 15/222* (2013.01); *G06F 16/634* (2019.01); *G10L 15/30* (2013.01); *G10L 25/51* (2013.01); *G10L 25/84* (2013.01)

(58) Field of Classification Search

CPC ....... G10L 15/222; G10L 15/30; G10L 25/51; G10L 25/84; G10L 17/00; G06F 16/634; G06F 16/90332; G06F 3/167; G16Y 40/10

See application file for complete search history.

(56) References Cited

U.S. PATENT DOCUMENTS

| | | | |
|---|---|---|---|
| 9,324,322 | B1 | 4/2016 | Torok et al. |
| 9,691,377 | B2 | 6/2017 | Gunn et al. |
| 10,192,425 | B2 | 1/2019 | Charlton |
| 10,402,439 | B2 | 9/2019 | Venkataraman et al. |
| 10,956,120 | B1 | 3/2021 | Chundi et al. |
| 11,146,597 | B2 | 10/2021 | Kwatra et al. |
| 12,002,471 | B2 | 6/2024 | Varshney et al. |
| 2008/0120616 | A1 | 5/2008 | James et al. |
| 2018/0130023 | A1 * | 5/2018 | Mantripragada .. G06Q 10/1053 |
| 2018/0204385 | A1 | 7/2018 | Sarangdhar et al. |

(Continued)

FOREIGN PATENT DOCUMENTS

WO 0237250 A2 5/2002

OTHER PUBLICATIONS

Mihalkova et al., "Learning to disambiguate search queries from short sessions," In Joint European Conference on Machine Learning and Knowledge Discovery in Databases pp. 111-127 (2009).

*Primary Examiner* — Darioush Agahi
(74) *Attorney, Agent, or Firm* — HG LAW LLP

(57) ABSTRACT

Systems and methods are described for managing digital assistant interaction. A query is received from a user, and a reply to the query is generated for output. An interruption for the user is detected, and subsequently an end of the interruption is detected. In response to detecting the end of the interruption, a predicted query related to the initial query is identified, and a prompt to provide a reply to the predicted query may be generated for output.

18 Claims, 8 Drawing Sheets

(56) References Cited

U.S. PATENT DOCUMENTS

| | | | | |
|---|---|---|---|---|
| 2018/0336897 | A1* | 11/2018 | Aggarwal | G10L 15/222 |
| 2018/0341703 | A1* | 11/2018 | McCarty | G06F 16/7867 |
| 2018/0367669 | A1 | 12/2018 | Nicholson et al. | |
| 2019/0066659 | A1 | 2/2019 | Imai et al. | |
| 2019/0198008 | A1* | 6/2019 | Guo | G10L 15/18 |
| 2019/0391788 | A1* | 12/2019 | Blake | G10L 25/54 |
| 2020/0045497 | A1 | 2/2020 | Kang et al. | |
| 2020/0333875 | A1* | 10/2020 | Bansal | G06F 9/3836 |
| 2020/0341804 | A1* | 10/2020 | Rakshit | G06N 5/02 |
| 2020/0342859 | A1 | 10/2020 | Aher et al. | |
| 2021/0031757 | A1* | 2/2021 | Boulton | B60W 40/09 |

* cited by examiner

INTERRUPTION DETECTION AND HANDLING BY DIGITAL ASSISTANTS

CROSS-REFERENCE TO RELATED APPLICATION(S)

This application is a continuation of U.S. patent application Ser. No. 16/950,397, filed Nov. 17, 2020, now U.S. Pat. No. 12,002,471, the disclosures of which is hereby incorporated by reference therein in its entirety.

BACKGROUND

This disclosure relates to improved digital assistant interaction. In particular, systems and methods are disclosed for detecting an interruption for a user during a session with a digital assistant, and in response to detecting an end of the interruption, performing an action to ameliorate or address the end of interruption.

SUMMARY

Many users have become accustomed to interacting with digital assistants (e.g., voice-based, text-based, a combination thereof, etc.). For example, a user may request a digital assistant to play music, find local restaurants in his or her area, or provide a weather report. In one approach, assistant applications may determine the context of a user's current query based on a query or queries recently received from the same user. Such context may be used, for example, when the assistant application is not able to determine a suitable reply for the current query without considering the context or topic of the recent query. In one approach, the assistant application may store context information related to the queries so that the assistant application may reference the context information when formulating a reply. However, such approach is deficient at least in part because storing context information indefinitely consumes finite memory of the assistant application, and unnecessary storage of such information over time may lead to a degradation in the assistant application's performance. In another approach, the context is deleted after a set period of time. However, this approach is deficient in an event of a user being interrupted. At the conclusion of an interruption the context may have been deleted, rendering the assistant application incapable of interpreting new queries. Moreover, when the context is deleted, the assistant application is unable to reinitiate the conversation related to that context.

In particular, it is also possible that, after the interruption ends, the user may have forgotten about his or her prior interaction with the assistant application and fail to re-engage the assistant application before the preset time expires. In this circumstance, the context information is deleted without notifying the user, even if the user would have been likely to continue interacting with the assistant application if he or she had remembered the prior interaction. Such a circumstance is a missed opportunity for the assistant application to utilize stored context data to provide an improved user interface (e.g., by re-initiating a conversation based on context stored before an interruption).

To overcome these problems, systems and methods are provided herein for, in response to detecting an end of an interruption, performing an action to ameliorate or address the end of interruption. For example, in response to detecting the end of the interruption, an assistant application may identify a predicted second query related to a first query received from a user prior to the interruption, and generate for output a prompt to provide a reply to the predicted second query. The assistant application may receive the first query, and generate for output a first reply to the first query. Later, the assistant application detects the interruption for the user, and subsequently detects an end of the interruption. The assistant application may not provide any replies during the interruption. In response to detecting the end of the interruption, the assistant application may identify the predicted second query related to the first query, and generate for output the prompt to provide a second reply to the predicted second query. The assistant application may alternatively or additionally perform a variety of other actions in response to detecting an end of an interruption, e.g., generate for output a comment or query in an effort to re-initiate the session with the user, reference the stored context of the user session to prompt the user to provide another query or request confirmation from the user to provide more information, generate for output a query referencing the interruption and providing an opportunity to resume the conversation, repeat the most recent reply to the query or other input of the user received prior to the interruption, and/or generate for output a reminder notification.

Such techniques enable an assistant application to proactively re-initiate a conversation with a user (e.g., no longer preoccupied by the detected interruption), by, for example, providing a suitable predicted query or suggestion based on the context of the conversation, or otherwise remind the user of the prior conversation, to facilitate continuing his or her session with the assistant application while retaining context. Moreover, such aspects enable resumption of the assistant session where the user may have otherwise forgotten or failed to re-initiate the conversation in a timely fashion, and the assistant application may have otherwise simply waited for a further input from the user and/or arbitrarily discarded information related to the user session. Advantageously, the context is not deleted during the interruption and is used to improve the user interface. In some embodiments, the assistant application may delete the context information if the user does not engage with the predicted prompt and/or other action performed by the assistant application in response to detecting the end of the query.

In some aspects of this disclosure, the assistant application may receive from the user a voice confirmation to provide the second reply, and generate for output the second reply in response to such voice confirmation. Each of the first query, the first reply, the prompt, and the second reply may be a voice reply.

In some embodiments, the assistant application may refrain from generating for output replies and prompts during the interruption (e.g., since the user may be likely to not hear, ignore, or be bothered by replies or prompts during this period of time).

In one or more embodiments, detecting the interruption for the user may comprise detecting the voice other than a voice of the user, and detecting the end of the interruption may comprise determining that a predetermined period of time has passed since the detecting of the voice other than the voice of the user.

In some aspects of this disclosure, the assistant application may be a voice assistant application, and the first query may be received by a voice assistant device, and detecting the interruption for the user may comprise detecting that the user has moved to a location that is outside a predetermined distance from the voice assistant device. In addition, detecting the end of the interruption may comprise detecting that the user has moved back to a location that is within the predetermined distance from the voice assistant device.

In some embodiments, detecting the interruption for the user may comprise detecting non-voice information, and determining that a sound level of the non-voice information exceeds a predetermined threshold. In addition, detecting the end of the interruption may comprise determining that a predetermined period of time has passed since the detecting of the non-voice information.

The assistant application may identify a predicted second query by retrieving, from a database, a user profile associated with the user, and identifying the predicted second query based on the retrieved user profile (e.g., social media, friends, contacts, internet searches, past queries, etc.).

In some aspects of this disclosure, the assistant application may identify the predicted second query by retrieving, from a database, a user profile associated with the user, and identifying the predicted second query based on the retrieved user profile (e.g., social media, friends, contacts, internet searches, past queries, etc.).

In one or more embodiments, the assistant application determines whether a duration of the interruption exceeds a predetermined threshold, where each of identifying the predicted second query related to the first query, and generating for output the prompt to provide the second reply to the predicted second query is performed in response to determining that the duration of the interruption exceeds the predetermined threshold.

In some embodiments, the assistant application may be a voice assistant application, and the first query is received by a voice assistant device, where the interruption for the user is detected based on a first communication received by the voice assistant device from a device, and the end of the interruption is detected based on a second communication received by the voice assistant device from the device.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1A:
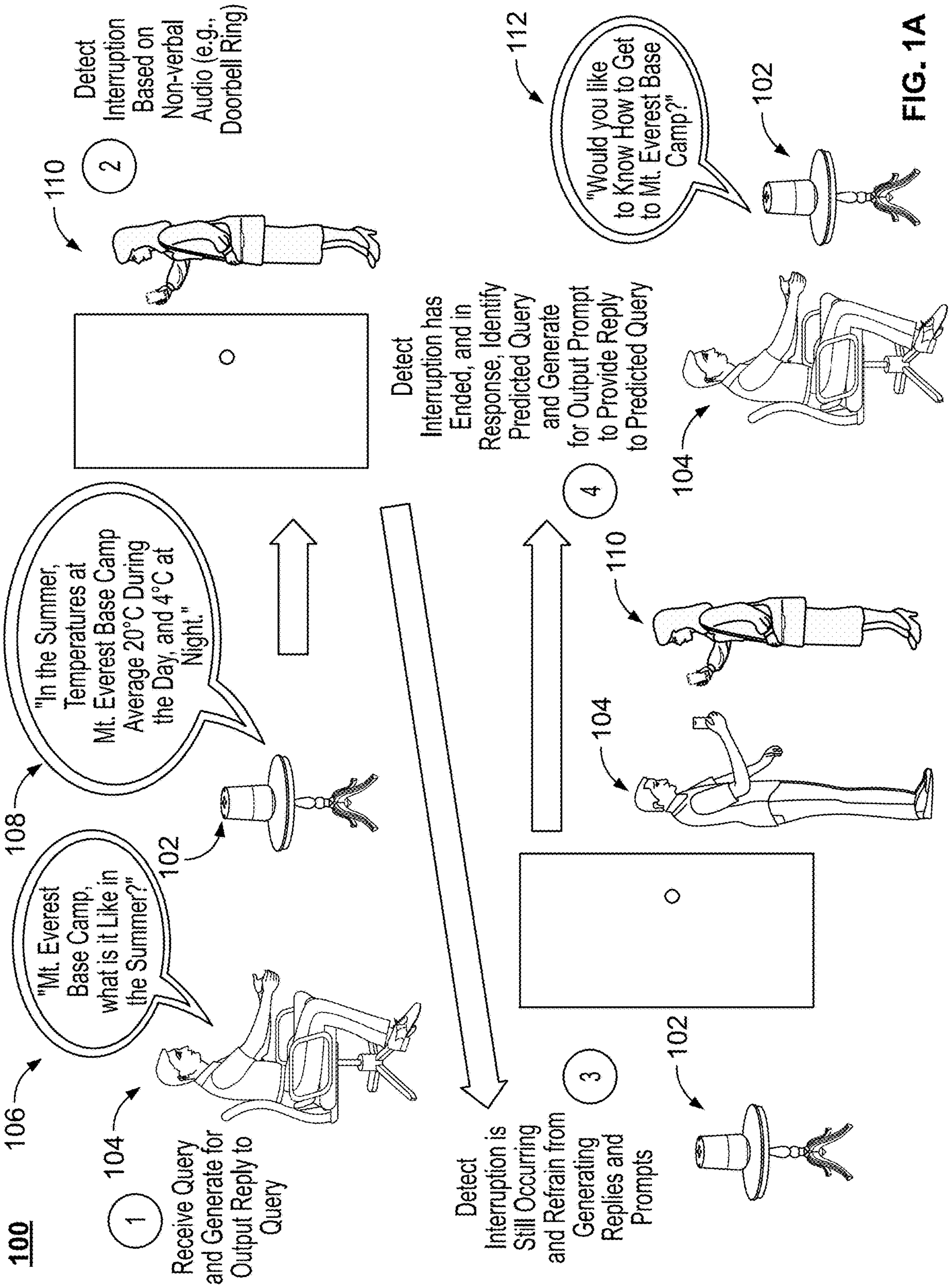
FIG. 1A shows an example of performing an action in response to detecting an end of an interruption for a user, in accordance with some embodiments of this disclosure.

FIG. 1A shows an example 100 for performing an action in response to detecting an end of an interruption for a user, in accordance with some embodiments of the present disclosure. Assistant device 102 is depicted as receiving query 106 from user 104 (e.g., in a household of user 104). In some embodiments, an assistant application (e.g., being executed on assistant device 102 and/or remote equipment 230 of FIG. 2) receives query 106, and generates for output reply 108 to query 106. The received queries and generated replies in FIG. 1A are shown as voice queries, and assistant device 102 is depicted as a voice assistant device, but it should be appreciated that any input by the user (e.g., queries, replies, commands, confirmations instructions, etc.) and any output by assistant device 102 (e.g., suggestions, replies, queries, and prompts to provide replies to predicted queries output by the assistant application) may be in any form (e.g., presented as text via a display of a mobile device running the assistant application, received via touch or biometrics, received or generated for output as voice, or any combination thereof).

The assistant application may, in a case that queries are in the form of voice or audio, transcribe the voice input to speech using automatic speech recognition (ASR), and use the transcribed text to determine suitable replies to the query, e.g., by comparing the transcribed text to one or more database records (e.g., content source 316 of FIG. 3) and/or performing an internet search based on the transcribed text. The assistant application may transcribe the audio response into a string of text (e.g., by any suitable automatic speech recognition technique), or transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety.

The assistant application may detect an interruption in the user session with assistant device 102. As shown in FIG. 1A, the interruption may be detected based on determining that user 110 rang a doorbell (e.g., at the household of user 104). It should be appreciated that an interruption may be detected based on one or more of a variety of events or occurrences, both verbal and non-verbal, and may be detected in a variety of ways as discussed above and below. For example, the assistant application may detect non-verbal interruptions at least in part based on sounds above a certain threshold (e.g., 80 dB or 90 dB), and/or upon detecting frequencies outside the frequency for human voices (e.g., 85 Hz-255 Hz), that persist for at least a threshold period of time (e.g., 5 seconds or 10 seconds), e.g., a dog barking in or near the household of user 104, a loud truck or landscaper near the household of user 104, footsteps of one or more users, alarm or phone ringing, etc. In some embodiments, a brief detection outside the human voice frequency (e.g., a car beeping or honking, a car driving by, etc.) may not be considered an interruption unless its duration exceeds the predetermined time period. In some embodiments, the assistant application may detect an interruption in response to determining that a user has moved to a location that is outside a predetermined distance (e.g., 5 feet or 10 feet) from assistant device 102, e.g., determined based on images of the user captured by a camera, based on a signal strength of a mobile device associated with a user relative to the assistant device, based on communication from another device, based on audio received from the user gradually decreasing, etc. The assistant application may utilize a timer to detect whether the user has moved out of range for longer than a threshold period of time (e.g., 5 or 10 seconds) prior to determining that the interruption for the user. Distance may be used alone or in combination with other factors detected or otherwise transmitted to the assistant application.

In some embodiments, the assistant application may determine a relative received signal strength indicator (RSSI) of a wireless signal between a mobile device of the user and assistant device 102, and, based on the RSSI, an estimated distance between the mobile device of the user and assistant device 102 (e.g., using a lookup table that returns distance as a function of RSSI). In another example, the assistant application may measure received radio frequency (RF) power over a shared wireless signal to estimate a location of the user. As another example, the assistant application may employ, or be in communication with a device that employs, any suitable computer vision or facial recognition techniques (e.g., on an image or video feed of a camera of a device already joined to an ongoing conference or of a device not yet joined to the conference) to recognize a location of user 104.

Figure 1B:
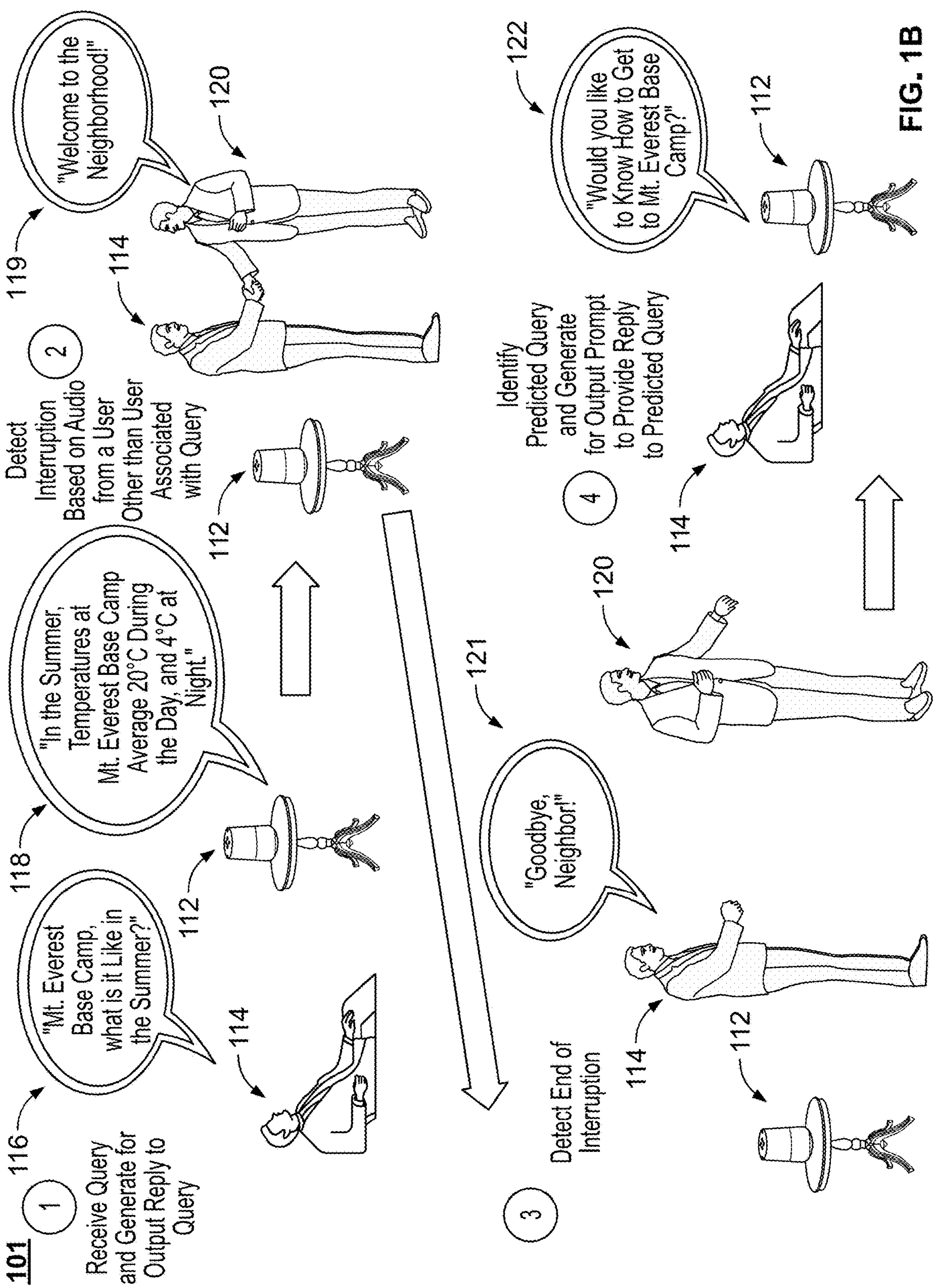
FIG. 1B shows an example of performing an action in response to detecting an end of an interruption for a user, in accordance with some embodiments of this disclosure.

In yet another embodiment, the assistant application may detect an interruption based on communications received from an internet of things (IOT) device (e.g., a smart doorbell, a smart lock, etc.) and/or based on detecting voices of a user other than user 104 (e.g., by comparing voice signatures of users), as discussed in further detail in the example of FIG. 1B. The assistant application may alternatively or additionally detect an interruption based on detecting user 104 is no longer engaged with assistant device 102 (e.g., determining the user is likely on a phone call based on a change in intonation of the user's voice or communications received from a mobile device of the user indicating the user is on a phone call). In some aspects of this disclosure, assistant device 102 may detect an interruption upon receiving instructions from a user that he or she desires to take a break in the conversation or is preoccupied.

In some embodiments, multiple assistant devices may be associated with user 104 (e.g., present on the home network of a household of user 104), and an interruption may be detected based on the combination of the multiple assistant devices (e.g., when the user moves to a location that is a predetermined distance from each of the assistant devices). In some embodiments, the assistant application may determine that an interruption has ended based on one or more events detected by a combination of the multiple assistant devices associated with the user. For example, the assistant application may determine that an interruption has ended if the user returns to a location within a predetermined range (e.g., 5 feet or 10 feet) from a particular assistant device of the multiple assistant devices associated with the user, even if the particular assistant device is not the initial assistant device the user interacted with. In this circumstance, such particular assistant device may attempt to re-initiate the conversation with the user, and the stored context of the conversation may be shared between assistant devices to facilitate performing an action in response to detecting an end of the interruption for the user (e.g., generating for output prompt 112 to provide a reply to a predicted query or otherwise providing an opportunity for the user to re-imitate the conversation with the assistant application).

In some embodiments, the assistant application may generate a voice signature (e.g., for user 104, user 110, etc.) based on a sequence of values representing various audio or acoustic features or characteristics (e.g., amplitude, modulation, tone, frequency, volume, speed, etc.) of a signal. Audio processing circuitry may analyze audio characteristics of the signal to identify audio signatures using any suitable audio analysis technique (e.g., frequency analysis to determine a base frequency and unique harmonic pattern of a particular voice, phoneme analysis to determine an accent of a particular voice, etc.). For example, the wave amplitude of the audio signal may be used to determine the volume of the voice of a user and/or analyze frequency data to determine the pitch and tone of the voice search query. The audio processing circuitry may also identify non-vocal audio such as music, sound effects, and the like using similar frequency analysis techniques or any other suitable method of audio analysis. The identified audio characteristics may be stored in association with a timestamp of when the audio signal was received. Audio signal processing is discussed in more detail in U.S. patent application Ser. No. 16/553,410, filed Aug. 28, 2019, which is hereby incorporated by reference herein in its entirety. In some embodiments, the audio signal may be converted to transcribed text, and such text may be used to generate the voice signature.

It should also be appreciated that, although FIG. 1A depicts the assistant application detecting the interruption after providing a response to a user query, the interruption may be detected at any point in the user session (e.g., after multiple queries and replies have been exchanged between assistant device 102 and the user, prior to the assistant device providing a reply to the user, prior to the user completing his or her query, etc.). In response to detecting the interruption, assistant device 102 may store (e.g., in storage 208 of FIG. 2) one or more of the queries, replies and/or prompts received or generated during the user session with assistant device 102, in order to preserve the context of the conversation while the interruption is occurring. In some embodiments, the stored queries, replies and/or prompts received or generated during the user session may be saved for a predetermined period of time after an end of the interruption has been detected (e.g., if the user is given an opportunity to re-initiate a conversation with the assistant application but does not respond).

As depicted in FIG. 1A, upon hearing the ring of the doorbell, user 104 may answer the door and interact with user 110. During this time, the assistant application may detect that the interruption is ongoing (e.g., based on images received from one or more cameras, based on a signal strength of a mobile device or a wearable device of the user, based on location data communicated by the mobile device or a wearable device of the user, based on the absence of detecting any further sounds since the doorbell ring was detected, etc.) In some embodiments, while detecting that the interruption is occurring, the assistant application may refrain from generating any replies or prompts, since generating such replies or prompts during the interruption may go unnoticed by the user or annoy or distract user 104 interacting with user 110. In some embodiments, the assistant device may include "always on" listening capabilities that may wake a device into an active state upon detection of a keyword or keyword phrase. For example, if the assistant application detects utterance by the user of the keyword or keyword phrase during the interruption, the assistant application may determine that the interruption has ended. Alternatively, the assistant application may ignore utterance by the user of the keyword or keyword phrase during the interruption, and instead wait for detection of another specified event prior to determining the interruption has ended.

The assistant application may subsequently determine that the interruption has ended. For example, as depicted in FIG. 1A, user 104 has moved back to a location within a vicinity of assistant device 102 after concluding his interaction with user 110 at the door of the household of user 104. The assistant application may determine the user has returned to a location within a predetermined distance (e.g., 5 feet or 10 feet) of assistant device 102 using a variety of techniques (e.g., based on location data transmitted by a mobile device or wearable device of user 104, based on signal strength data transmitted by a mobile device or wearable device of user 104, based on images of user 104 captured by a camera, based on motion sensors or measurements by other sensors, based on communications transmitted by IOT devices, etc., or any combination thereof).

The assistant application may then perform an action to address or ameliorate detecting the end of the interruption for the user. For example, the assistant application may identify one or more predicted queries related to query 106 by, for example, conducting an internet search and/or referencing a database (e.g., content source 316 of FIG. 3, a library of past questions by the user or users related to the second user, social media activity associated with the user or users related to the user, etc.). The action to address or ameliorate the detection of the end of the interruption for the user may additionally or alternatively include any other action performed by the assistant application (e.g., with the objective of providing the user an opportunity to re-engage with the assistant application after the interruption for the user). For example, upon detecting the end of the interruption, the assistant application may generate for output a comment or query in an effort to re-initiate the session with the user, reference the stored context of the user session to prompt the user to provide another query or request confirmation from the user to provide more information, generate for output a query referencing the interruption and providing an opportunity to resume the conversation, repeat the most recent reply to the query or other input of the user received prior to the interruption, generate for output a reminder notification, etc.

Once the assistant application identifies the predicted query, or otherwise identifies a suitable output intended to provide the user an opportunity to re-initiate his or her session with the assistant application, the assistant application may generate for output a suitable message (e.g., prompt 112 for the user to provide a reply to the predicted query). Accordingly, the assistant application proactively attempts to re-initiate the user's session with assistant device 102 upon detecting the interruption for the user has ended. In some embodiments, the assistant application may recite potentially interesting facts to the user along with the predicted query to capture the attention of the user (e.g., "Your friend Mike also visited Mt. Everest base camp at this time of year and had a great time. Would you like to know how to get to Mt. Everest base camp?") based on referencing other websites or applications (e.g., social media) associated with the user. In some embodiments, the predicted query, or other message generated for output by the assistant application, may incorporate one or more advertisements (e.g., recommend test driving a new car at a particular showroom near the location of the user, if the context of the conversation related to cars).

In some embodiments, the assistant application may receive from user 104 a confirmation (e.g., via voice or other input) to provide a reply to prompt 112. As depicted in FIG. 1A, the assistant application may, in response to receiving such a confirmation to provide a reply, generate for output flight schedules for the user to travel to Mt. Everest base camp. In some embodiments, the assistant application may interface with one or more applications (e.g., email, calendar, social media) associated with the user to suggest possible dates for such a flight that does not conflict with other obligations of the user.

FIG. 1B shows an example 101 of performing an action in response to detecting an end of an interruption for a user, in accordance with some embodiments of the present disclosure. Assistant device 112 receives query 116 from user 114 (e.g., in the household of user 114), and in response the assistant application generates for output reply 118 to query 116. The assistant application may generate for output reply 118 by referencing content source 316 of FIG. 3 (e.g., to perform an internet search across one or more web pages, reference a database of query and response pairs for comparison to the current query, etc.). In some embodiments, one or more voice signatures of users may be stored (e.g., in assistant data source 318 of FIG. 3), to enable the assistant application to identify the user that is interacting with assistant device 112.

As depicted in FIG. 1B, user 120 may move towards user 114 and greet 119 user 114.

The assistant application may detect the voice of user 120 (e.g., based on audio sampled by a microphone of assistant device 112) and analyze the voice of user 120 to determine that the voice of user 120 differs from the voice of user 114 (e.g., by generating a voice signature for user 120 and comparing such voice signature to a voice signature for user 114). In some embodiments, a voice signature may be stored in connection with a profile of user 114 (and profiles associated with other users may have their respective voice signatures stored). In response to detecting the voice signature of user 120 based on greeting 119, the assistant application may detect an interruption.

In some aspects of this disclosure, the assistant application may permit a group of users to be designated as part of a group conversation, such that the assistant application may not consider audio from any of the users who are part of the group to be an interruption, but may consider audio from users outside the group an interruption. In some embodiments, the assistant application may wait until the audio associated with user 120 has been ongoing for a continuous (or non-continuous) period of time within a certain time window (e.g., user 120 has spoken for a total of at least 10 seconds in a 30-second time window, or user 120 has spoken for a total of at least 5 seconds in a 20-second time window) prior to detecting an interruption for user 114.

The assistant application may detect an end of the interruption for the user upon determining that the conversation between users 112, 120 has ended. For example, the assistant application may detect the end of the interruption in response to determining that a voice of user 120 has not been detected, and/or no voices have been detected, for a predetermined period of time (e.g., 5 seconds or 10 seconds). In some embodiments, the assistant application may detect the end of the interruption based on certain trigger words or phrases 121 (e.g., "Goodbye," "Talk to you later," "See you soon," etc.) and/or based on detected occurrences (e.g., a camera capturing images of user 120 exiting the household of user 114).

In response to detecting the end of the interruption for the user, the assistant application may perform an action to address or ameliorate the end of the interruption. For example, the assistant application may generate for output a prompt 122 to provide a reply to a predicted query. The prompt 122 may be in any form (e.g., audio, text, displayed via a user interface, or any combination thereof). In some embodiments, if the user ignores or does not respond to prompt 122 for a predetermined period of time (e.g., 5 seconds or 10 seconds), the assistant application may cause the stored context of the conversation during the user session to be deleted. Alternatively, the assistant application may cause the stored context of the conversation during the user session to be deleted in response to receiving user instruction that he or she is not interested in continuing the conversation, or in response to the assistant application determining that the duration of the interruption has exceeded a predetermined time period (e.g., 30 minutes or 1 hour).

The action to address or ameliorate the detection of the end of the interruption for the user may additionally or alternatively include any other action performed by the assistant application (e.g., with the objective of providing the user an opportunity to re-engage with the assistant application after the interruption for the user). For example, upon detecting the end of the interruption, the assistant application may generate for output a comment or query in an effort to re-initiate the session with the user, reference the stored context of the user session to prompt the user to provide another query or request confirmation from the user to provide more information, generate for output a query referencing the interruption and providing an opportunity to resume the conversation, repeat the most recent reply to the query or other input of the user received prior to the interruption, generate for output a reminder notification, etc.

In some embodiments, such as where a user interacts with an assistant device via touch (e.g., touchscreen, keyboard, joystick, etc.), the assistant device may detect an interruption when a fingerprint other than a fingerprint of user 114 associated with initial query 116 is detected. For example, the assistant application may reference a database (e.g., assistant data source 318 of FIG. 3) which may store identifiers of fingerprints of users and compare the stored identifier to a currently detected fingerprint in order to determine whether an interruption has occurred. The assistant application may, upon detecting the fingerprint of user 114 (e.g., after the fingerprint of user 120 was intermittently detected), determine that the interruption has ended, and processing may continue to performing an action to address or ameliorate the end of the interruption (generating for output prompt 122 to user 114 to provide a reply to a predicted query).

Although the topic and/or context of queries, replies and prompts of the examples of FIGS. 1A-1B relate to Mt. Everest base camp, it should be appreciated that the topic or context of the conversation taking place during a user session with assistant device 102, 112 is not limited to this example, and may encompass and/or relate to any topic. For example, the assistant application may receive various queries or commands regarding a recipe prior to detecting an interruption (e.g., a doorbell ringing or a washing machine cycle concluding), and, in response to detecting the end of the interruption, generate for output a prompt (e.g., "Would you like to order the ingredients for that recipe you were looking up?"). In some embodiments, the assistant application may be in an "always listening" mode, and monitor audio during an interruption for the user (e.g., during a phone call). If the monitored audio during the phone call is relevant to the stored context the assistant application may generate for output a prompt incorporating relevant information from the phone call (e.g., a recipe ingredient discussed during the phone call, which may have been on speaker phone).

Figure 2:
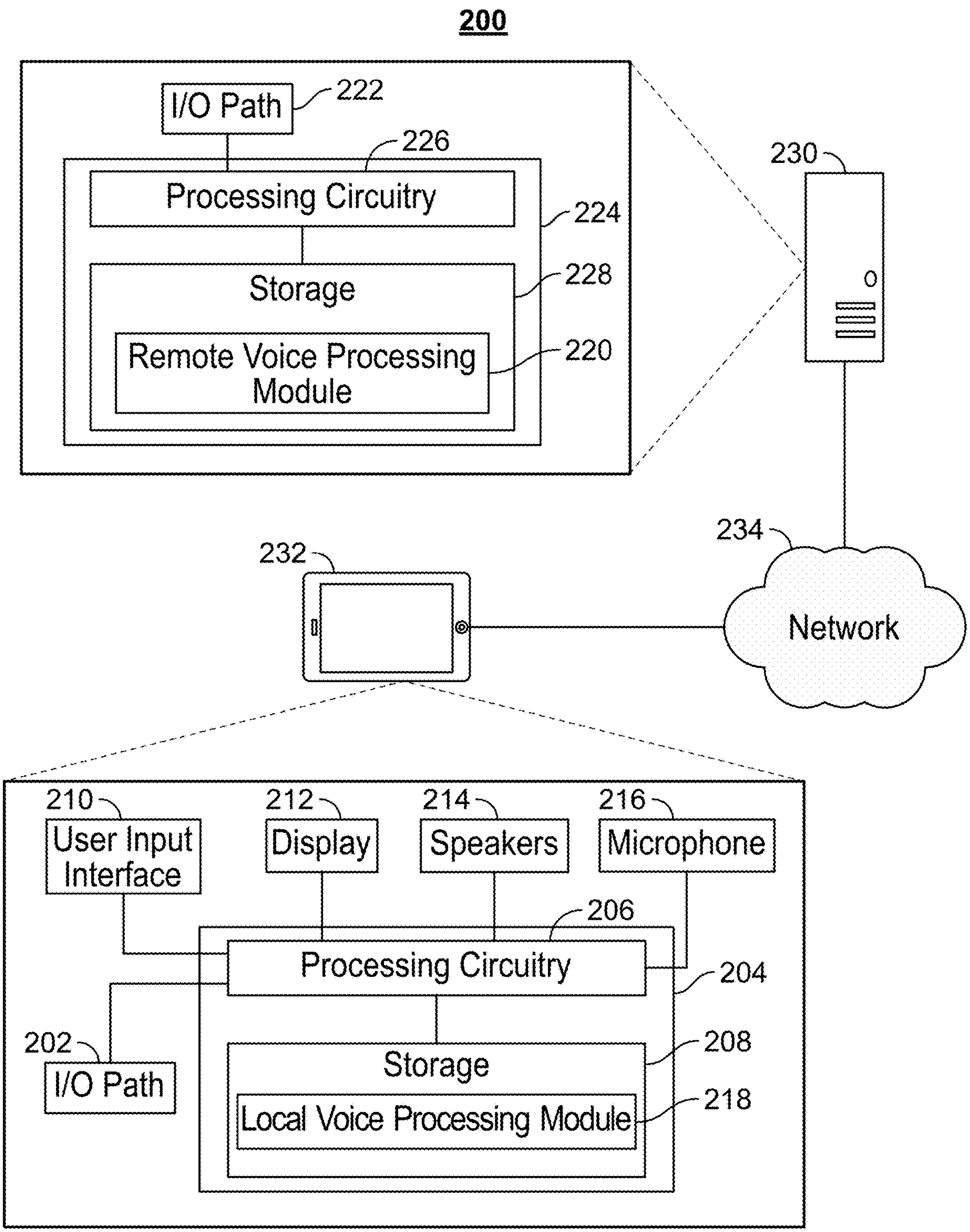
FIG. 2 is a block diagram of an illustrative system in accordance with some embodiments of the disclosure.

Users may access the assistant application (and associated audio prompts and/or associated display screens described above and below) from one or more of their user equipment devices. FIG. 2 shows a generalized embodiment of illustrative user equipment device 102, 112 connected with a remote server. More specific implementations of user equipment devices are discussed below in connection with FIG. 3. System 200 is depicted having user equipment 232 (e.g., a user's assistant) connected to remote equipment 230 (e.g., a server) via network 234. User equipment 232 may be connected to network 234 via a wired or wireless connection and may receive content and data via input/output ("I/O") path 202. Remote equipment 230 may be connected to network 234 via a wired or wireless connection and may receive content and data via I/O path 222. I/O path 202 and/or I/O path 222 may be I/O circuitry or include I/O circuitry, and may provide content (e.g., broadcast programming, on-demand programming, Internet content, and other video, audio, or information) and data to control circuitry 204 and/or remote control circuitry 224, which includes processing circuitry 206 and storage 208, and/or remote processing circuitry 226 and remote storage 228, respectively. Control circuitry 204 may be used to send and receive commands, requests, and other suitable data using I/O path 202. I/O path 202 may connect control circuitry 204 (and specifically processing circuitry 206) to one or more communications paths (described below). Likewise, remote control circuitry 224 may be used to send and receive commands, requests, and other suitable data using I/O path 222. I/O functions may be provided by one or more of these communications paths, but are shown as a single path in FIG. 2 to avoid overcomplicating the drawing.

Control circuitry 204 and remote control circuitry 224 may be based on any suitable processing circuitry 206 and 226 (e.g., processing circuitry based on one or more microprocessors, microcontrollers, digital signal processors, programmable logic devices, etc.). In some embodiments, control circuitry 204 executes instructions for an assistant application (e.g., local voice processing module 218) stored in memory (i.e., storage 208). In client/server-based embodiments, control circuitry 204 may include communications circuitry suitable for communicating with an application server or other networks or servers (e.g., remote equipment 230). For example, the assistant application may include a first module (e.g., local voice processing module 218) on user equipment 232 and may communicate via I/O path 202 over network 234 to remote equipment 230 associated with a second module of the assistant application (e.g., remote voice processing module 220). With or without user input, the assistant application may coordinate communication over communications circuitry between local voice processing module 218 and remote voice processing module 220 to execute voice commands issued by a user. Communications circuitry may include a modem or other circuitry for connecting to a wired or wireless local or remote communications network. Such communications may involve the Internet or any other suitable communications networks or paths (which is described in more detail in connection with FIG. 3). In addition, communications circuitry may include circuitry that enables peer-to-peer communication of user equipment devices (e.g., WiFi®-direct, Bluetooth®, etc.), or communication of user equipment devices in locations remote from each other. Although modules 218 and 220 are depicted in FIG. 2 as voice processing modules, it should be appreciated that such modules may alternatively or additionally be configured to process any kind of input (e.g., text-based input, touch input, biometric input, or any combination thereof).

Memory (e.g., random-access memory, read-only memory, or any other suitable memory), hard drives, optical drives, or any other suitable fixed or removable storage devices may be provided as storage 208 and/or remote storage 228. Storage 208 and/or remote storage 228 may include one or more of the above types of storage devices. Storage 208 and/or remote storage 228 may store instructions that when executed by control circuitry 204 and/or control circuitry 224 causes the steps described above and below to be performed by the assistant application. Storage 208 and/or remote storage 228 may be used to store various types of content described herein and assistant application data, including program information, guidance application and/or assistant application settings, user preferences or profile information, or other data used in operating the guidance application and/or assistant application (e.g., local voice processing module 218 and/or remote voice processing module 220). Nonvolatile memory may also be used (e.g., to launch a boot-up routine and other instructions). Though local voice processing module 218 and remote voice processing module and depicted as modules in storage in storage 208 and remote storage 228, respectively, voice processing modules 218 and 220 may include additional hardware or software that may not be included in storages 208 and 228. For example, local voice processing module 218 may include hardware, and firmware associated with the hardware, for accelerating the processing and detection of keywords uttered by the user.

A user may control the control circuitry 204 using user input interface 210. User input interface 210 may be any suitable user interface, such as a remote control, mouse, trackball, keypad, keyboard, touch screen, touch pad, stylus input, joystick, microphone, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images. Speakers 214 may be provided as integrated with other elements of user equipment device 200 or may be stand-alone units. The audio prompts of the assistant application may be played through speakers 214. In some embodiments, the audio may be distributed to a receiver (not shown), which processes and outputs the audio via speakers 214. User equipment 232 may comprise microphone 216.

The assistant application may be implemented using any suitable architecture. For example, it may be a stand-alone application wholly implemented on user equipment 232. In such an approach, instructions of the application are stored locally (e.g., local voice processing module 218), and data for use by the application is downloaded on a periodic basis (e.g., a network connection, or using another suitable approach). In another embodiment, the assistant application is a client/server-based application. Data for use by a thick or thin client implemented on user equipment device 232 may be retrieved on-demand by issuing requests to a server (e.g., remote equipment 230) remote to user equipment 232. In one example of a client/server-based application, control circuitry 204 runs a web browser that interprets web pages provided by a remote server.

In some embodiments, the assistant application may include a plurality of modules implemented on a plurality of devices (e.g., user equipment 232 and remote equipment 230) to execute the features and functionalities of the assistant application. The assistant application may be configured such that features of the assistant application that require processing capabilities beyond that of user equipment 232 are performed on a server associated with the assistant application (e.g., remote equipment 230) while other capabilities of the assistant application are performed on user equipment 232. For example, the assistant application may comprise a first module (e.g., local voice processing module) implemented on user equipment 232 that detects when a speaks to the device and may perform preliminary processing on the sound input to determine whether the user spoke a keyword associated with the device. The assistant application may comprise a second module (e.g., remote voice processing module 220) implemented on a second device (e.g., remote equipment 230) for performing additional processing on the sound input, such as verifying that the keyword was spoken by the user and extracting any additional commands that may have been included in the voice input.

Though exemplary system 200 is depicted having two devices implementing two modules of the assistant application, any number of modules or devices may be used. An exemplary assistant application may comprise a plurality of modules for detecting and processing the input (e.g., voice, text, touch, biometric, etc., or any combination thereof) from a user, e.g., a first module for detecting sound input, a second module for detecting a keyword in the sound input, a third module for verifying whether the keyword was spoken, and a fourth module for processing additional voice input from the user in the sound input. The exemplary assistant application may be implemented across a plurality of devices. For example, a voice assistant device (e.g., a standalone device that executes voice commands spoken by a user or an application running on an operating system of user equipment, such as a tablet) may execute the first module for detecting the sound input and may transmit the sound input to the second module to detect a keyword in the sound input. In response to detecting the keyword by the second module, the voice assistant device may transmit the voice input to a second device (e.g., a server located remote to the voice assistant device that has greater sound analysis capabilities than the voice assistant device) that is associated with the third module for verifying whether a keyword is included in the voice input. In response to verifying that the keyword is included in the voice input, the server may process the voice input to detect any additional voice commands in the voice input. Though the assistant application is discussed in relation to control circuitry 204 running on a user device (e.g., user equipment 232) it should be understood that any of the features and functionalities of the assistant application may be split across multiple modules running on any control circuitry, such as control circuitry 208 local to a user device or control circuitry remote to the user device (e.g., remote control circuitry 224).

Figure 3:
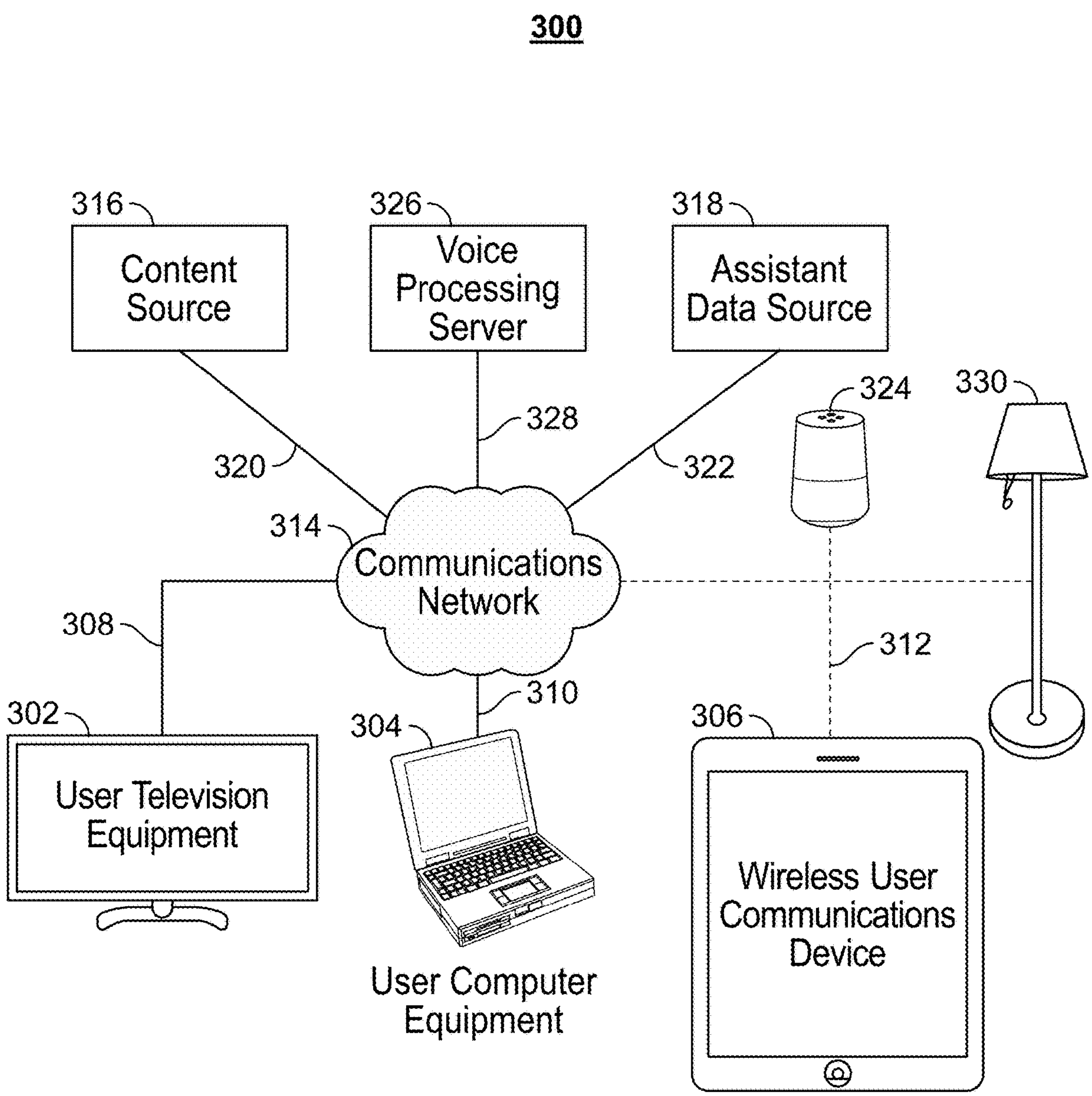
FIG. 3 is another block diagram of an illustrative system in accordance with some embodiments of the disclosure.

User equipment 232 of FIG. 2 may be implemented in system 300 of FIG. 3 as user television equipment 302, user computer equipment 304, wireless user communications device 306, assistant device 324, IOT device 330, or any other type of user equipment suitable for interfacing with the assistant application. For simplicity, these devices may be referred to herein collectively as user equipment or user equipment devices. User equipment devices, on which an application is at least partially implemented, may function as a standalone device or may be part of a network of devices (e.g., each device may comprise an individual module of the assistant application). Various network configurations of devices may be implemented and are discussed in more detail below.

User television equipment 302 may include a set-top box, an integrated receiver decoder (IRD) for handling satellite television, a television set, a digital storage device, a DVD recorder, a local media server, or other user television equipment. One or more of these devices may be integrated to be a single device, if desired. User computer equipment 304 may include a PC, a laptop, a tablet, a personal computer television (PC/TV), a PC media server, a PC media center, or other user computer equipment. Wireless user communications device 306 may include a mobile telephone, a portable video player, a portable music player, a portable gaming machine, a wireless remote control, or other wireless devices. Assistant device 324 may include a smart speaker, a standalone voice assistant, smarthome hub, etc. IOT device 330 may include any of a plurality of devices in a user's home (e.g., a light controller, washing machine, security camera, etc.).

It should be noted that the lines have become blurred when trying to classify a device as one of the above devices. In fact, each of user television equipment 302, user computer equipment 304, wireless user communications device 306, assistant device 324, and IOT device 330 may utilize at least some of the system features described above in connection with FIG. 2 and, as a result, include some or all of the features of the assistant application described herein. For example, user television equipment 302 may implement an assistant application that is activated upon detecting a voice input comprising a keyword. The assistant application may also have the same layout on the various different types of user equipment or may be tailored to the display capabilities of the user equipment. For example, on user computer equipment 306, the assistant application may be provided in a visual layout where the assistant application may recite audio prompts of the assistant application. In another example, the assistant application may be scaled down for wireless user communications devices. In another example, the assistant application may not provide a graphical user interface (GUI) and may listen to and dictate audio to a user such as for assistant device 324 or IOT device 330, which in some instances, may not comprise a display. Various network-connected devices or IOT devices may be connected via a home network and may be capable of being controlled using IOT applications and using the assistant device.

In system 300, there may be more than one of each type of user equipment device but only one of each is shown in FIG. 3 to avoid overcomplicating the drawing. In addition, each user may utilize more than one type of user equipment device (e.g., a user may have a television set and a computer) and also more than one of each type of user equipment device (e.g., a user may have an assistant device and a mobile telephone and/or multiple IOT devices).

The user may also set various settings to maintain consistent settings across in-home devices and remote devices. For example, a weather location on a personal computer of the user may be set at an office of the user on his or her assistant application, and such weather location may also appear on the assistant application in the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the assistant application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile device (e.g., iPhone) network, cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well other short-range point-to-point communication paths, wireless paths (e.g., Bluetooth®, infrared, IEEE 902-11x, etc.), or other short-range communication via wired or wireless paths. BLUETOOTH® is a certification mark owned by Bluetooth SIG, INC. The user equipment devices may also communicate with each other directly through an indirect path via communications network 314.

System 300 includes content source 316, assistant data source 318, and voice processing server 326 coupled to communications network 314 via communication paths 320, 322, and 328, respectively. Paths 320, 322, 328 may include any of the communication paths described above in connection with paths 308, 310, and 312. Communications with the content source 316 and assistant data source 318 may be exchanged over one or more communications paths, but are shown as a single path in FIG. 3 to avoid overcomplicating the drawing. In addition, there may be more than one of each of content source 316 and assistant data source 318, but only one of each is shown in FIG. 3 to avoid overcomplicating the drawing. Different types of each of these sources are discussed below. If desired, content source 316 and assistant data source 318 may be integrated as one source device. Although communications between sources 316 and 318 with user equipment devices 302, 304, 306, 324, and 328 are shown as through communications network 314, in some embodiments, sources 316 and 318 may communicate directly with user equipment devices 302, 304, 306, 324, and 328 via communication paths (not shown) such as those described above in connection with paths 308, 310, and 312.

Content source 316 may store or index a plurality of data used for responding to user prompts received by the assistant application. In some embodiments, content source 316 may index the location of content located on servers located remotely or local to content source 316. In response to receiving a query (e.g., in the form of voice, text, touch, biometric or any combination thereof), the assistant application may access the index stored on content source 316 and may identify a server (e.g., a database stored on a server) comprising the information to respond to the user's query. For example, the assistant application may receive a voice query requesting the weather forecast. In response to receiving the query, the assistant application may search content source 316 for a website that contains weather information, may access the website for the weather information, and may audibly recite the weather information to the user.

Assistant data source 318 may provide data used during the operation or function of the assistant application. For example, assistant data source may store user profile information, information about the speaking cadence of the user, lists of keywords and functions associated with the assistant application, etc. In some embodiments, updates for the assistant application may be downloaded via assistant data source 318.

The assistant application may be, for example, a stand-alone application implemented on user equipment devices. In other embodiments, assistant application may be a client-server application where only the client resides on the user equipment device. For example, the assistant application may be implemented partially as a client application on control circuitry 204 of devices 302, 304, 306, 324, and/or 328 and partially on a remote server as a server application (e.g., assistant data source 318, content source 316, or voice processing server 326). The guidance application displays and/or assistant application displays may be generated by assistant data source 318, content source 316, voice processing server 326 and transmitted to the user equipment devices. Assistant data source 318, content source 316, and voice processing server 326 may also transmit data for storage on the user equipment, which then generates the assistant application displays and audio based on instructions processed by control circuitry.

System 300 is intended to illustrate a number of approaches, or configurations, by which user equipment devices and sources and servers may communicate with each other. The present invention may be applied in any one or a subset of these approaches, or in a system employing other approaches for delivering and providing an assistant application.

Figure 4A:
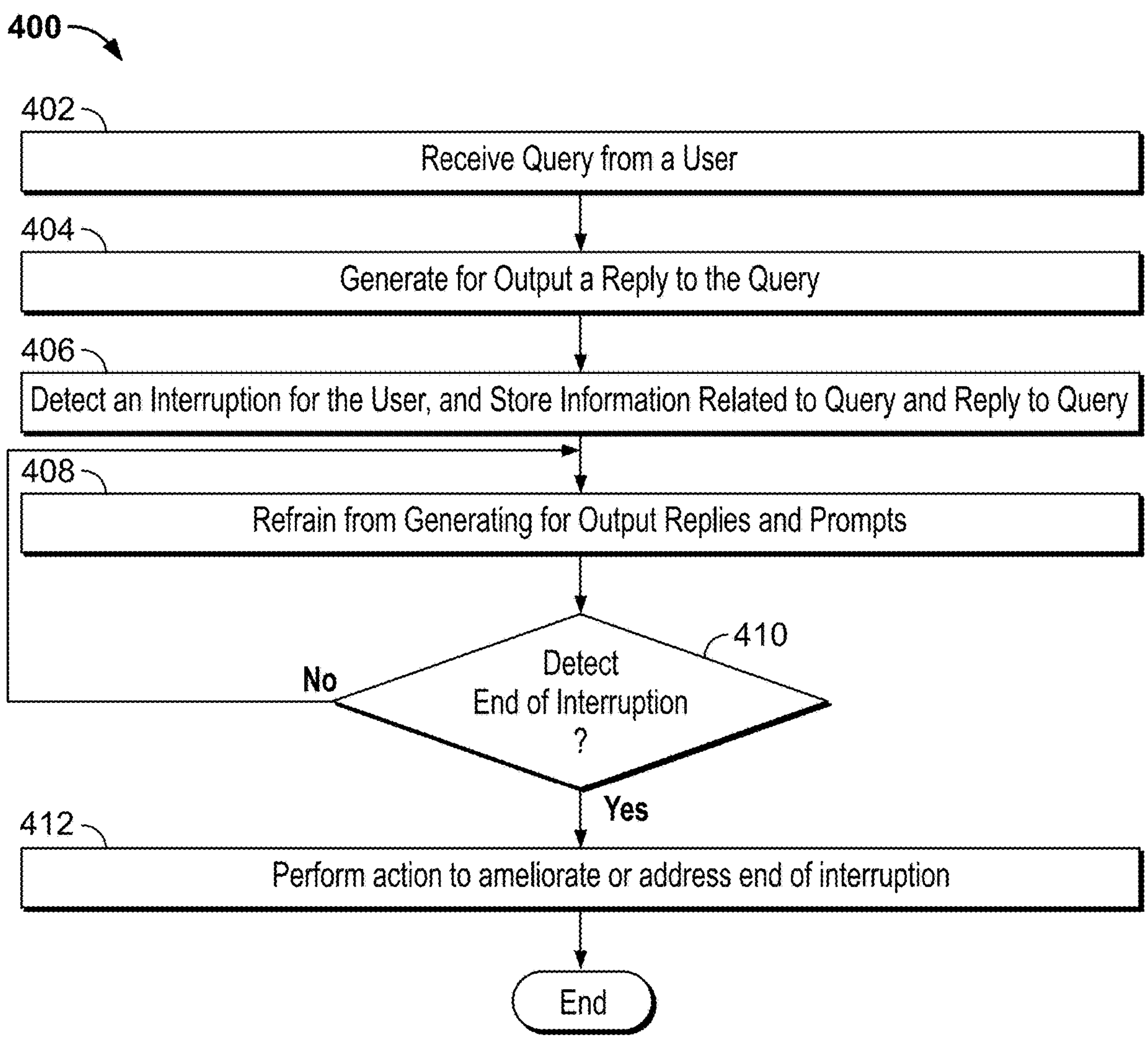
FIG. 4A is a flowchart of a detailed illustrative process for performing an action to address an end of a detected interruption for a user, in response to detecting an end of the interruption, in accordance with some embodiments of this disclosure.

FIG. 4A is a flowchart of an illustrative process for performing an action in response to detecting an end of an interruption for a user, in accordance with some embodiments of the disclosure. It should be noted that process 400 or any step thereof could be performed on, or provided by, any of the devices shown in FIGS. 2-3. For example, process 400 may be executed by user equipment 232 (e.g., via control circuitry 204) and/or remote equipment 230 (e.g., via control circuitry 224), as instructed by an assistant application encoded onto a non-transitory storage medium (e.g., storage 208 and/or storage 228) as a set of instructions that may be decoded and executed by processing circuitry (e.g., processing circuitry 206 and/or processing circuitry 226) and implemented on user equipment 232 and/or remote equipment 230, such as to distribute control of assistant application operations. In addition, one or more steps of process 400 may be incorporated into or combined with one or more steps of any other process or embodiment (e.g., process 400 of FIG. 4A, process 500 of FIG. 5, process 600 of FIG. 6).

At 402, I/O circuitry (e.g., user input interface 210 of FIG. 2) may receive a query (e.g., query 106 in FIG. 1A) from a user (e.g., user 104 in FIG. 1A). The query may relate to any topic. For example, the query may relate to any topic that is searchable on the internet and/or stored in a database of queries (e.g., content source 316).

At 404, control circuitry (e.g., control circuitry 224 of remote equipment 230 and/or control circuitry 204 of user equipment 232) generates for output a reply (e.g., reply 108 of FIG. 1A) to the query (e.g., query 106). The control circuitry may reference the internet, a database (e.g., content source 316 of FIG. 3) and/or personal preferences of the user (e.g., stored at assistant data source 318 of FIG. 3) in generating for output the reply.

At 406, the control circuitry may detect an interruption for the user, and store information related to the query (e.g., query 106 in FIG. 1A) and the reply (e.g., reply 108 of FIG. 1A) to the query (e.g., in order to preserve context of the conversation occurring during the user session). Detecting the interruption for the user is discussed in more detail in connection with FIG. 5.

At 408, the control circuitry (e.g., control circuitry 224 of remote equipment 230 and/or control circuitry 204 of user equipment 232) may refrain from generating output replies and prompts while the interruption is occurring, so as to minimize distractions to the user during the interruption and/or to avoid a situation where the user is not present or is otherwise not able to interact with the assistant application.

At 410, the control circuitry may determine whether an end of the interruption is detected. If the control circuitry does not detect the end of the interruption, processing may return to 408 (e.g., the assistant application may continue to refrain from generating for output replies and prompts). If the control circuitry detects the end of the interruption, processing may continue at 412. Detecting the end of the interruption for the user is discussed in more detail in connection with FIG. 5.

At 412, the control circuitry may perform an action to ameliorate or address the detected end of the interruption. For example, upon detecting the end of the interruption, the assistant application may generate for output a comment or query in an effort to re-initiate the session with the user (e.g., "You were saying something?") or reference the stored context of the user session to prompt the user to provide another query or request confirmation from the user to provide more information (e.g., "Do you have any other questions about Mt. Everest base camp?" or "Do you want to learn more about Mt. Everest base camp?"). As another example, the assistant application may generate for output a query referencing the interruption and providing an opportunity to resume the conversation (e.g., "It looks like our conversation was interrupted. Would you like to know more about Mt. Everest base camp?"). In some embodiments, upon detecting the end of the interruption, the assistant application may repeat the most recent reply to the query or other input of the user received prior to the interruption (e.g., in an effort to remind the user of the conversation and re-initiate the conversation). Additionally or alternatively, upon detecting the end of the interruption the assistant application may generate for output a reminder notification (e.g., having a predefined or user-selected audio sound or a predefined or user-selected displayed icon that the user may associate with an interrupted conversation, text, or any combination thereof).

Figure 4B:
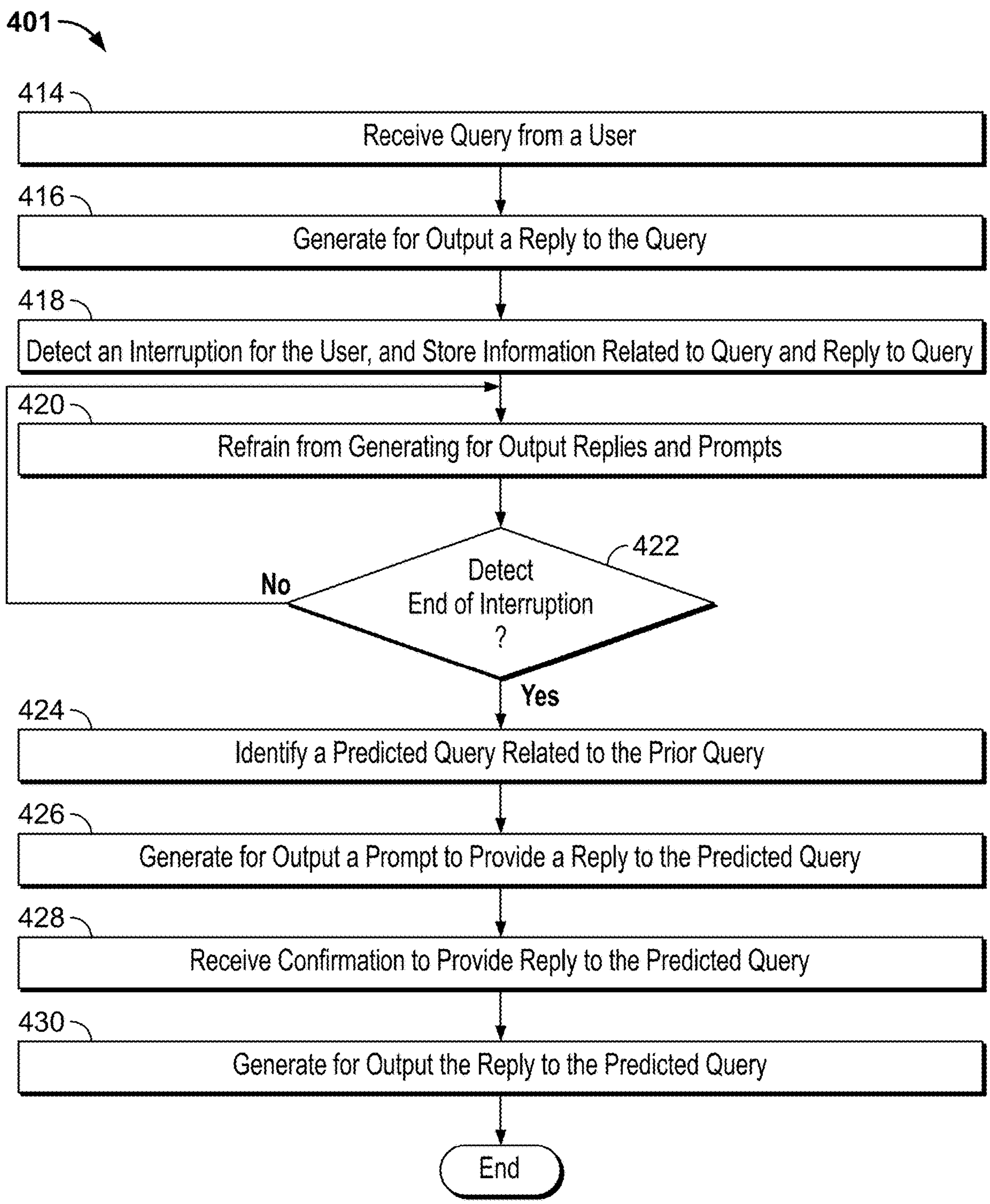
FIG. 4B is a flowchart of a detailed illustrative process for generating for output a prompt to provide a reply to a predicted query in response to detecting an end of an interruption for a user, in accordance with some embodiments of this disclosure.

Although the examples of FIGS. 4A-4B show the assistant application receiving a single query and providing a reply to the query prior to detecting the interruption, it should be noted that the assistant application may alternatively have not had an opportunity to provide a reply prior to detecting the interruption (e.g., if the interruption is detected while receiving the initial query of the user) or the assistant application may have provided a series of replies to various queries of the user during the user session, prior to detecting the interruption (e.g., the interruption may be detected upon detecting a break in the conversational queries and replies for at least a predefined time period).

In some embodiments, the control circuitry may receive from the user a query or response to the action performed by the assistant application in response to detecting the end of the interruption. For example, in response to the reminder or query generated for output by the assistant application, the user may confirm that he or she would like to learn more about Mt. Everest base camp, or the user may provide an additional query, related or unrelated to the context of the prior conversation, to the assistant application. In some embodiments, the response from the user may be an instruction to commence presentation of a media asset (e.g., a movie, a television show, a song, a video, etc.) which may have been referenced in the stored context of the prior user session. The control circuitry may generate for output a reply to the query or more information based on the confirmation received from the user. For example, the control circuitry may reference the internet, a database (e.g., content source 316 of FIG. 3) and/or personal preferences of the user (e.g., stored at assistant data source 318 of FIG. 3) in generating for output the reply.

FIG. 4B is a flowchart of an illustrative process for generating for output a prompt to provide a reply to a predicted query in response to detecting an end of an interruption, in accordance with some embodiments of the disclosure. It should be noted that process 401 or any step thereof could be performed on, or provided by, any of the devices shown in FIGS. 2-3. For example, process 401 may be executed by user equipment 232 (e.g., via control circuitry 204) and/or remote equipment 230 (e.g., via control circuitry 224), as instructed by an assistant application encoded onto a non-transitory storage medium (e.g., storage 208 and/or storage 228) as a set of instructions that may be decoded and executed by processing circuitry (e.g., processing circuitry 206 and/or processing circuitry 226) and implemented on user equipment 232 and/or remote equipment 230, such as to distribute control of assistant application operations. In addition, one or more steps of process 401 may be incorporated into or combined with one or more steps of any other process or embodiment (e.g., process 400 of FIG. 4A, process 500 of FIG. 5, process 600 of FIG. 6).

At 414, I/O circuitry (e.g., user input interface 210 of FIG. 2) may receive a query (e.g., query 106 in FIG. 1A) from a user (e.g., user 104 in FIG. 1A). The query may relate to any topic. For example, the query may relate to any topic that is searchable on the internet and/or stored in a database of queries (e.g., content source 316).

At 416, control circuitry (e.g., control circuitry 224 of remote equipment 230 and/or control circuitry 204 of user equipment 232) generates for output a reply (e.g., reply 108 of FIG. 1A) to the query (e.g., query 106). The control circuitry may reference the internet, a database (e.g., content source 316 of FIG. 3) and/or personal preferences of the user (e.g., stored at assistant data source 318 of FIG. 3) in generating for output the reply.

At 418, the control circuitry may detect an interruption for the user, and store information related to the query (e.g., query 106 in FIG. 1A) and the reply (e.g., reply 108 of FIG. 1A) to the query (e.g., in order to preserve context of the conversation occurring during the user session). Detecting the interruption for the user is discussed in more detail in connection with FIG. 5.

At 420, the control circuitry (e.g., control circuitry 224 of remote equipment 230 and/or control circuitry 204 of user equipment 232) may refrain from generating output replies and prompts while the interruption is occurring, so as to minimize distractions to the user during the interruption and/or to avoid a situation where the user is not present or is otherwise not able to interact with the assistant application.

At 422, the control circuitry may determine whether an end of the interruption is detected. If the control circuitry does not detect the end of the interruption, processing returns to 420 (e.g., the assistant application may continue to refrain from generating for output replies and prompts). If the control circuitry detects the end of the interruption, processing continues at 424. Detecting the end of the interruption for the user is discussed in connection with more detail in FIG. 5.

At 424, the control circuitry may identify a predicted query related to the prior query (e.g., based on the stored information related to a context of the conversation). For example, one or more databases (e.g., content source 316, assistant data source 318) may store historical data on various queries received from the user in the past (e.g., "What is a good time to visit?"; How do I get there?"), and/or search history of the user on various search engines, and the control circuitry may reference the historical data in identifying a predicted query. Alternatively or in addition to referencing the historical data of the user, the control circuitry may reference interests of the user indicated in a user profile or inferred from interactions with other users (e.g., via text message, e-mail, social media, in person, etc.). The profile of the user in connection with the assistant application may be linked to one or more other profiles of the user (e.g., the profile of the user with an over-the-top content provider, cable provider, social media profile, email address, etc.). For example, the assistant application may detect that a friend of a user on social media recently visited Mt. Everest, and incorporate this information into a predicted query. In some embodiments, the assistant application may refer to a list of popular or common questions (e.g., a list of the most commonly asked questions about Mt. Everest). In addition, the assistant application may keep track of what questions have been asked by the user (e.g., in the current session or in prior sessions) to avoid including repeating a query already suggested or asked in connection with the predicted query.

At 426, the control circuitry (e.g., control circuitry 224 of remote equipment 230 and/or control circuitry 204 of user equipment 232) generates for output a prompt (e.g., prompt 112 of FIG. 1A) to provide a reply to the predicted query. In some embodiments, if I/O circuitry (e.g., user input interface 210 of FIG. 2) does not receive a response within a predetermined period of time (e.g., 10 seconds), the control circuitry may cause the stored conversation information to be deleted. Steps 424 and 426 are discussed in more detail in connection with FIG. 6.

At 428, the control circuitry may receive confirmation from the user (e.g., user 104 of FIG. 1A) to provide a reply to the predicted query. In some embodiments, the reply is provided by the user within a predetermined time period from the predicted query being generated for output. Alternatively or in addition, if the user indicates that he or she is not interested in a reply to the predicted query, the control circuitry may generate for output a different predicted query, or refrain from generating any more prompts or queries until further input is received from the user. In some embodiments, further queries may be received from the user to continue the conversation and may be stored (e.g., for use in the event of a subsequent interruption).

At 430, the control circuitry may generate for output the reply to the predicted query. For example, the control circuitry may reference the internet, a database (e.g., content source 316 of FIG. 3) and/or personal preferences of the user (e.g., stored at assistant data source 318 of FIG. 3) in generating for output the reply.

Figure 5:
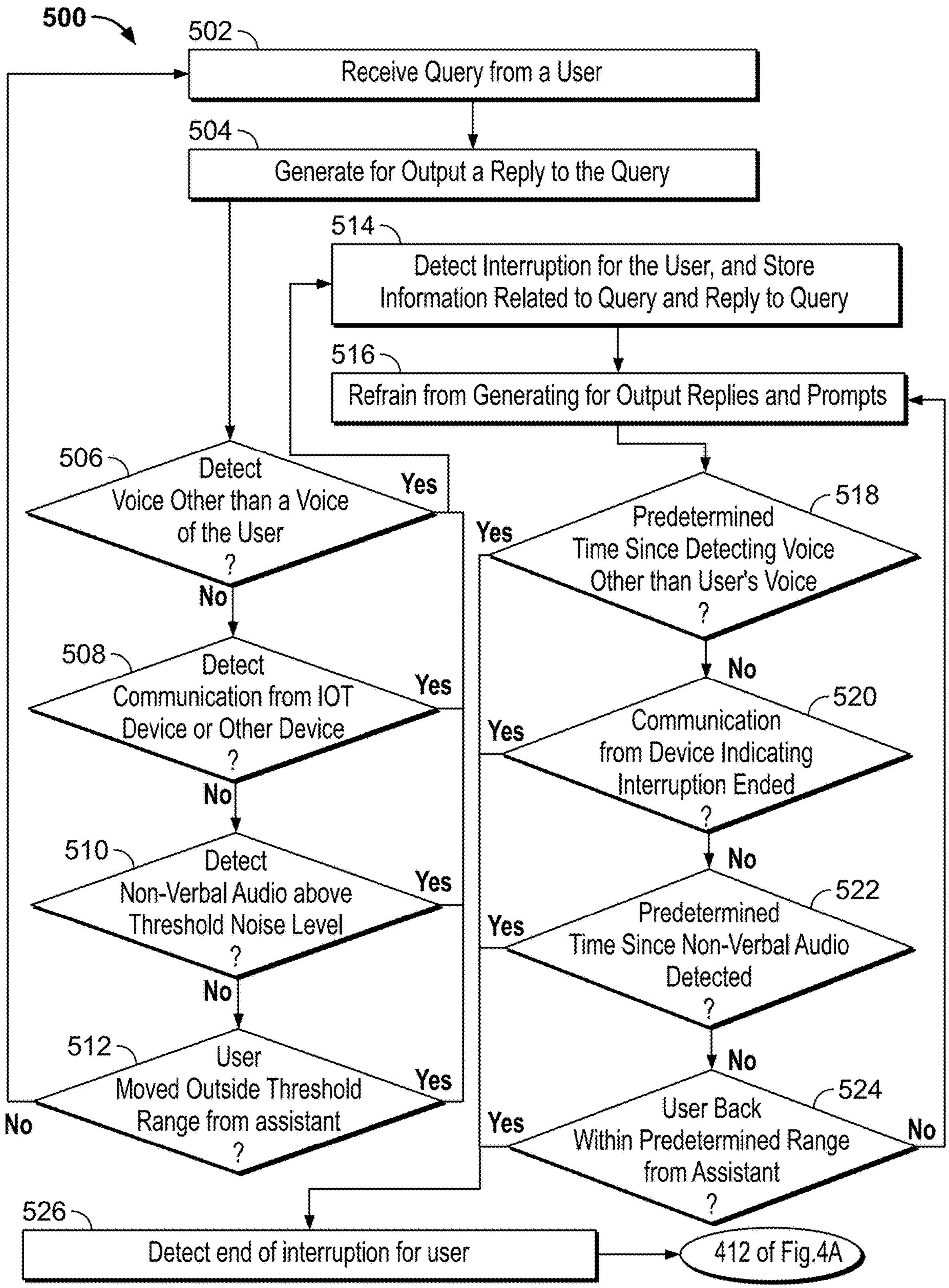
FIG. 5 is a flowchart of a detailed illustrative process for detecting an interruption for a user and detecting an end of the interruption for the user, in accordance with some embodiments of this disclosure.

FIG. 5 is a flowchart of an illustrative process for detecting an interruption for a user and detecting an end of the interruption for the user, in accordance with some embodiments of the disclosure. It should be noted that process 500 or any step thereof could be performed on, or provided by, any of the devices shown in FIGS. 2-3. For example, process 500 may be executed by user equipment 232 (e.g., via control circuitry 204) and/or remote equipment 230 (e.g., via control circuitry 224), as instructed by an assistant application encoded onto a non-transitory storage medium (e.g., storage 208 and/or storage 228) as a set of instructions that may be decoded and executed by processing circuitry (e.g., processing circuitry 206 and/or processing circuitry 226) and implemented on user equipment 232 and/or remote equipment 230, such as to distribute control of assistant application operations. In addition, one or more steps of process 500 may be incorporated into or combined with one or more steps of any other process or embodiment (e.g., process 400 of FIG. 4A, process 401 of FIG. 4B, process 600 of FIG. 6).

At 502, I/O circuitry (e.g., user input interface 210 of FIG. 2) may receive a query (e.g., query 116 in FIG. 1B) from a user (e.g., user 114 of FIG. 1B). The query may relate to any topic. For example, the query may relate to any topic that is searchable on the internet or stored in a database of queries (e.g., content source 316).

At 504, control circuitry (e.g., control circuitry 224 of remote equipment 230 and/or control circuitry 204 of user equipment 232) generates for output a reply (e.g., reply 118 of FIG. 1B) to the query (e.g., query 116). The control circuitry may reference the internet, a database (e.g., content source 316 of FIG. 3) and/or personal preferences of the user (e.g., stored at assistant data source 318 of FIG. 3) in generating for output the reply.

Steps 506-512 show exemplary occurrences that may be used to detect an interruption for the user. It should be understood that any one of these occurrences may be sufficient for detecting an interruption for the user. Alternatively, any two, or any combination, of these occurrences may be used to detect the interruption for the user. While all of steps 502-512 are shown, it should be appreciated that some of these steps may be optional or excluded.

At 506, control circuitry (e.g., control circuitry 224 of remote equipment 230 and/or control circuitry 204 of user equipment 232) may determine whether a voice input received by I/O circuitry (e.g., user input interface 210) is a voice (e.g., in person, or in a phone call) of a user (e.g., user 120 of FIG. 1B) other than the user (e.g., user 114 of FIG. 1B) associated with the query (e.g., query 116 of FIG. 1B). For example, the control circuitry may compare voice signatures stored in a profile of the user to a voice signature generated based on the received voice information, to determine whether there is a match, which may correspond to whether the voice signatures match above a predetermined threshold, e.g., 50% match. If there is not a match, processing may move to 514. If there is a match (e.g., the same user associated with the query is still speaking), the assistant application may determine whether the received input corresponds to a query for the assistant application.

At 508, the control circuitry may determine whether communication is received from an IOT device or other device that is indicative of an interruption for the user. For example, an IOT things device (e.g., device 330, a smart lamp, smart doorbell, a smart washing machine, as smart oven, etc.) may notify an assistant device (e.g., user television equipment 302, user computer equipment 304, wireless user communications device 306, voice assistant 324, etc.) that the doorbell has rung. The assistant application may determine that such a doorbell ring constitutes an interruption for the user, and processing may proceed to 514. In some embodiments, the notification from the IOT device may be used in conjunction with detecting that the user has moved away from the assistant device to detect an interruption for the user (e.g., since the user may ignore the doorbell or washing machine cycle being complete). In some embodiments, when a phone call is received by a user, a notification indicating the user is on a phone call may be sent to the assistant application, and the assistant application may determine that the assistant session with the user has been interrupted by the phone call.

At 510, the control circuitry may determine whether non-verbal audio of a predetermined type (e.g., stored in one or more databases) has been received, and/or whether the non-verbal audio is above a threshold noise level. For example, if a user (e.g., user 114 of FIG. 1B) has a dog in his or her household, the assistant application may detect barking from the dog. However, it may be frustrating to the user if the assistant application detects an interruption each time the dog barks or otherwise makes a noise. Thus, if the duration of the barking is less than a threshold level of frequency (e.g., one detected bark every three seconds) and/or the barking is relatively low (e.g., an average noise level below 50 dB), the assistant application may ignore the ambient sounds. On the other hand, the assistant application may determine that certain non-verbal audio constitutes an interruption (e.g., a doorbell ring, footsteps), even if such non-verbal audio does not continue for at least the threshold time period (and/or occur with a threshold level of frequency).

At 512, control circuitry may determine that a user has moved outside a predetermined range (e.g., 10 feet) from an assistant device (e.g., user television equipment 302, user computer equipment 304, wireless user communications device 306, voice assistant 324, etc.). In addition, the assistant application may determine whether the user remains beyond the threshold distance from the voice assistant for at least a threshold time period (e.g., 10 seconds). The control circuitry may determine the user has moved away from the assistant device using a variety of techniques (e.g., based on images captured by a camera, based on location data transmitted by a mobile device of the user, based on signal strength indicators transmitted by a mobile device of the user). Upon determining that the user moved outside predetermined range from voice assistant for a predetermined amount of time (e.g., for at least 10 seconds), processing may move to 514.

At 514, the control circuitry may detect an interruption for the user and store information related to the query (e.g., query 116 in FIG. 1B) and the reply (e.g., reply 118 of FIG. 1B) to the query (e.g., in order to preserve context of the conversation occurring during the user session). At 516, the control circuitry may refrain from generating for output replies and prompts, based on detecting the interruption for the user at 514.

Steps 518-524 show exemplary occurrences that may be used to detect an end of an interruption for the user. It should be understood that any one of these occurrences may be sufficient for detecting an end of the interruption for the user.

Alternatively, any two, or any combination, of these occurrences may be used to detect end of the interruption for the user. While all steps 518-524 are shown, it should be appreciated that some of these steps may be optional or excluded.

At 518, the control circuitry (e.g., control circuitry 224 of remote equipment 230 and/or control circuitry 204 of user equipment 232) may determine whether a predetermined time period or a predetermined amount of time (e.g., 10 seconds) has passed since detecting a voice of a user (e.g., user 120 of FIG. 1B) other than the user (e.g., user 114 of FIG. 1B) associated with the query (e.g., query 116 of FIG. 1B). If the predetermined amount of time or predetermined time period has passed, the control circuitry may detect that the interruption for the user has ended. In some embodiments, the assistant application may detect the end of the interruption based on certain trigger words or phrases 121 (e.g., "Goodbye," "talk to you later," "see you soon," etc.) and/or based on detected occurrences (e.g., a camera capturing images of user 120 exiting the household of user 114).

At 520, the control circuitry may determine whether a communication indicating an interruption has ended has been received from a device. For example, an IOT device (e.g., a smart lock) may have detected an interruption based on determining that a user has left his or her house, and such IOT device may transmit a notification to the assistant application when the user returns to his or her house, which may cause the assistant application to detect an end of the interruption for the user. As another example, a mobile device of the user may transmit a notification to the assistant application indicating that a phone call of the user has concluded, which may cause the assistant application to detect an end of the interruption for the user.

At 522, the control circuitry may determine that a predetermined amount of time has elapsed since non-verbal audio was detected. For example, the assistant application may begin a timer after detecting a dog's bark, and if the timer reaches a threshold time (e.g., 10 seconds) without detecting another bark from the dog, the assistant application may determine that the interruption for the user has ended. As another example, the assistant application may detect a sound corresponding to footsteps of the user is becoming increasingly louder (e.g., the user is moving back towards the assistant device). Based on detecting the footsteps of the user becoming increasingly loud, the assistant application may detect an end of the interruption for the user.

At 524, the control circuitry may determine the user (e.g., user 114 of FIG. 2) has moved to a location back within a predetermined range (e.g., 10 feet) from an assistant device.

Such determination may be made in a variety of ways (e.g., based on images captured by a camera, based on communications between a mobile device of the user and the assistant device, etc.). In some embodiments, the user may instruct the assistant application to re-initiate the conversation (e.g., by querying the assistant "Where were we?"), which may cause the assistant application to determine that the user is within a predetermined range of the voice assistant and thus detect the end of the interruption for the user.

At 526, the control circuitry determines that an end of the interruption is detected, and processing continues to 412 of FIG. 4A (or 424 of FIG. 4B), discussed in further detail above.

Figure 6:
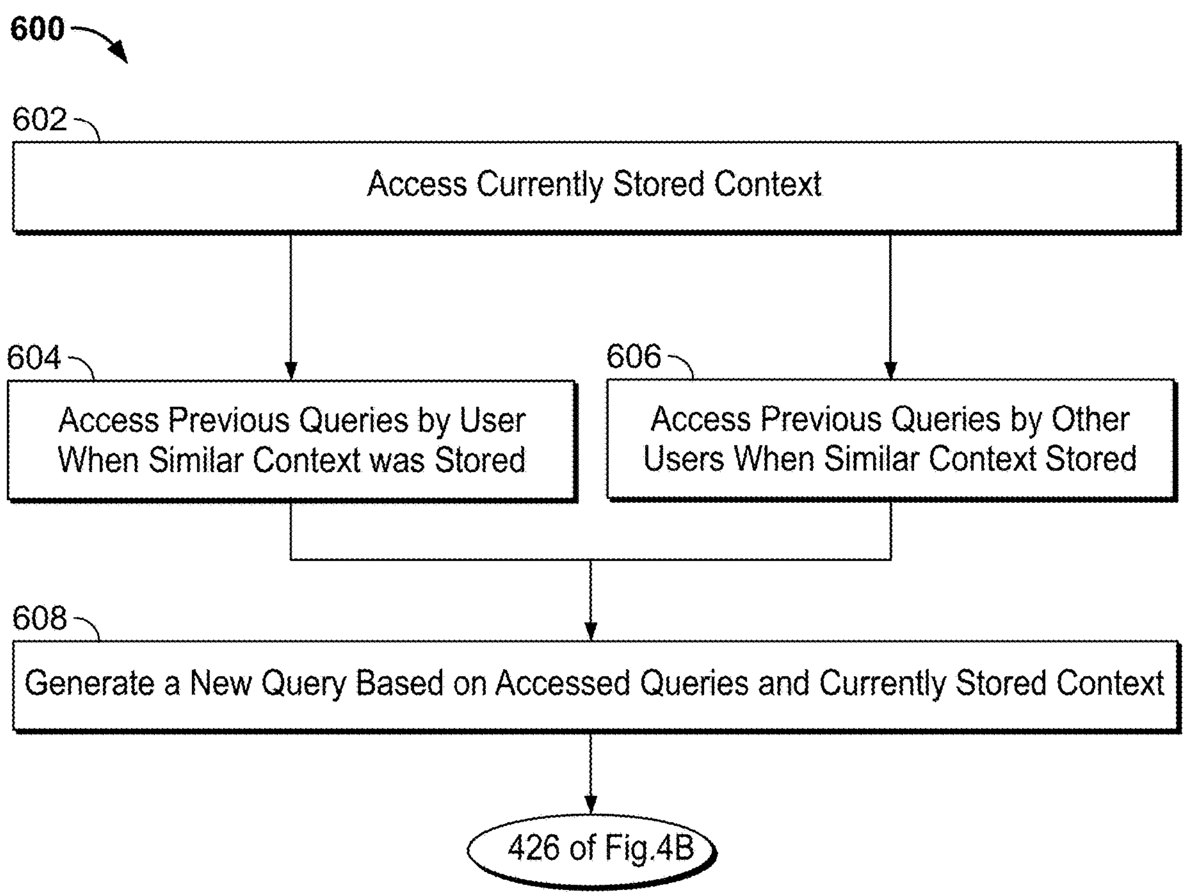
FIG. 6 is a flowchart of a detailed illustrative process for generating for output a new query based on accessed queries and currently stored context, in accordance with some embodiments of this disclosure.

FIG. 6 is a flowchart of an illustrative process for generating a new query based on accessed queries and currently stored context, in accordance with some embodiments of the disclosure. It should be noted that process 600 or any step thereof could be performed on, or provided by, any of the devices shown in FIGS. 2-3. For example, process 600 may be executed by user equipment 232 (e.g., via control circuitry 204) and/or remote equipment 230 (e.g., via control circuitry 224), as instructed by an assistant application encoded onto a non-transitory storage medium (e.g., storage 208 and/or storage 228) as a set of instructions that may be decoded and executed by processing circuitry (e.g., processing circuitry 206 and/or processing circuitry 226) and implemented on user equipment 232 and/or remote equipment 230, such as to distribute control of assistant application operations. In addition, one or more steps of process 600 may be incorporated into or combined with one or more steps of any other process or embodiment (e.g., process 400 of FIG. 4A, process 401 of FIG. 4B, process 500 of FIG. 5).

At 602, the control circuitry (e.g., control circuitry 224 of remote equipment 230 and/or control circuitry 204 of user equipment 232), in response to detecting an end of an interruption for the user, accesses the currently stored context of the conversation (e.g., based on the exchange of queries and replies) in the user session prior to the interruption for the user. The context may be stored in an assistant device (e.g., storage 208 of user equipment 232) and/or a server (e.g., storage 228 of remote equipment 230). In some embodiments, the assistant application may determine a context of the queries and replies in the most recent user session by extracting or analyzing entities or keywords in text strings (e.g., converted from audio to text) of the queries and replies and/or categorizing (e.g., assigning one or more data tags to) the queries and replies in the prior user session. For example, natural language processing circuitry or other linguistic analysis circuitry may apply linguistic, sentiment, and grammar rules to tokenize words from a text string, identify part-of-speech (i.e., noun, verb, pronoun, preposition, adverb, conjunction, participle, article), perform named entity recognition, and identify phrases, sentences, proper nouns, or other linguistic features of the text string of the queries and replies in the most recent user session.

At 604, the control circuitry may access previous queries by the user (e.g., received by the assistant application) when similar context was stored (e.g., in association with a user profile of the user in connection with the assistant application). For example, to determine previous stored queries having similar context to the current context, the control circuitry may compare keywords associated with the previous queries and replies associated with the user (e.g., stored at content source 316, assistant data source 318 and/or voice processing server 326 of FIG. 3) to the one or more keywords extracted from the queries and replies associated with the currently stored context. Additionally or alternatively, the control circuitry may compare one or more data tags assigned to the previous queries and replies associated with the user to data tags associated with the currently stored context, to identify previously stored queries by the user with a similar context. In some embodiments, the assistant application may interface with other applications (e.g., search history of the user on one or more web browsers, social media profile of the user, media consumption habits of the user) to identify previous queries in a context similar to the currently stored context.

At 606, the control circuitry may access previous queries by other users (e.g., received by the assistant application) when a similar context was stored (e.g., stored in association with respective user profiles of the users in connection with the assistant application). In some embodiments, the other users (e.g., user 110 of FIG. 1A or user 120 of FIG. 1B) may have profiles linked to the user (e.g., user 104 or user 114)

associated with the currently stored context. Additionally or alternatively, the assistant application may refer to queries in similar contexts by all other users of the assistant application or similar applications. In some embodiments, to determine previous queries from other users having similar context to the current context, the control circuitry may compare keywords associated with the previous queries and replies associated with the other users (e.g., stored at content source 316, assistant data source 318 and/or voice processing server 326 of FIG. 3) to the one or more keywords extracted from the queries and replies associated with the currently stored context. Additionally or alternatively, the control circuitry may compare one or more data tags assigned to the previous queries and replies associated with the other users to data tags associated with the currently stored context, to identify prior queries by the user when a similar context was stored. In some embodiments, the assistant application may interface with other applications when accessing previous queries (e.g., if a friend or follower on a social media profile of the user associated with the currently stored context posted a message relevant to the currently stored context).

At 608, the control circuitry generates a new query (e.g., to be used as the predicted query in prompt 112 of FIG. 1A to provide a reply to predicted query) based on the accessed queries and the currently stored context. For example, the assistant application may determine that the user frequently queries "How do I get to <<a location>>?" when the stored context is associated with a location (e.g., the user may have queried "How do I get to Mt. McKinley?" or "How do I get to the Eiffel Tower?" in the past). The assistant application may compare the currently stored context (e.g., related to the location Mt. Everest, as in the examples of FIGS. 1A-1B) to such similar contexts including locations. Based on such comparison, the assistant application may identify that the currently stored context is related to location, and generate a suitable predicted query (e.g., by replacing the previously referenced location of "Mt. McKinley" to the currently referenced location of "Mt. Everest" to generate: "Would you like to know how to get to Mt. Everest base camp?") based on the comparison. Processing may then move to 426 of FIG. 4B.

In some embodiments, the assistant application, when generating the new query, may exclude queries already asked by the user in queries related to the currently stored context, and/or queries already asked by the user in connection with previous queries when a similar context was stored. For example, if the assistant application determines that a user previously queried the assistant application "How can I get to Mt. Everest base camp?" in a prior user session or a current user session, the assistant application may generate a new predicted query (e.g., "How much would it cost to travel to Mt. Everest base camp?" or "Do I need a visa in order to travel to Mt. Everest base camp?") to be included in a prompt to re-initiate the conversation with the user. In some embodiments, the assistant application may identify a suitable template from among one or more stored templates of queries, and the new query may be a revised version of the stored template, modified to conform to the currently stored context.

In one or more embodiments, the assistant application may utilize Hugging Face's® Transformers library of algorithms to determine context or intent of the user and/or other users, and/or to generate predicted queries (or otherwise generate output) based on the determined context or intent. Hugging Face's® Transformers library is described, for example, in Thomas Wolf et al., *Transformers: State-of-the-Art Natural Language Processing*, Cornell University Archive, Jul. 14, 2020, at 1-8.), which is hereby incorporated by reference herein in its entirety.

It should be noted that while FIG. 6 is discussed in the context of generating for output a predicted query, the techniques and discussion of FIG. 6 may be used to perform any action to ameliorate or address detecting the end of the interruption (e.g., with the objective of providing the user an opportunity to re-engage with the assistant application after the interruption for the user). For example, the techniques of FIG. 6 may be utilized to generate for output a comment or query in an effort to re-initiate the session with the user, reference the stored context of the user session to prompt the user to provide another query or request confirmation from the user to provide more information, generate for output a query referencing the interruption and providing an opportunity to resume the conversation, repeat the most recent reply to the query or other input of the user received prior to the interruption, generate for output a reminder notification, etc.

It is contemplated that the steps or descriptions of FIGS. 4-6 may be used with any other embodiment of this disclosure. In addition, the descriptions described in relation to the process of FIGS. 4-6 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIGS. 4-6 may be implemented on a combination of appropriately configured software and hardware, and that any of the devices or equipment discussed in relation to FIGS. 1-3 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

detecting, by a device executing an assistant application, a first audio signal of a first audio source, the first audio signal comprising a first query;

generating for output a first reply to the first query;

detecting a second audio signal of a second audio source;

determining that the second audio signal is an interruption to the first audio signal by:

generating a first audio signature from the first audio signal;

generating a second audio signature from the second audio signal;

comparing the first audio signature to the second audio signature;

based on the comparing, determining whether the first audio signature matches the second audio signature; and determining that the first audio source is different than the second audio source based in part on determining that the first audio signature does not match the second audio signature;

determining that the second audio signal has been detected for at least a predetermined period of time within a time window;

based on determining that the second audio signal is an interruption to the first audio signal, refraining, by the device, from generating any output;

determining that the interruption has ended; and based on determining that the interruption has ended, ending the refraining and generating for output a second reply, the second reply relating to at least one of the first query or the first reply.

2. The method of claim 1, further comprising:

accessing a database comprising a plurality of stored audio signatures; and comparing the second audio signature to the plurality of stored audio signatures to determine a source type corresponding to the second audio signature;

wherein determining that the first audio source is different than the second audio source is further based in part on the source type corresponding to the second audio signature.

3. The method of claim 2, wherein the plurality of stored audio signatures comprises audio signatures associated with a plurality of users.

4. The method of claim 1, wherein determining that the second audio signal is an interruption to the first audio signal is based in part on receiving a communication from a second device.

5. The method of claim 1, wherein determining that the second audio signal is an interruption to the first audio signal is further based on determining that the second audio signal is a non-verbal audio signal comprising an amplitude exceeding a threshold level.

6. The method of claim 1, wherein determining that the second audio signal is an interruption to the first audio signal is further based on determining that the first audio source has moved to a distance from the device that exceeds a threshold distance.

7. The method of claim 6, wherein determining that the interruption has ended is based in part on determining that the first audio source has moved to within the threshold distance from the device.

8. The method of claim 1, further comprising:

storing a timestamp associated with the detecting the second audio signal;

wherein determining that the interruption has ended is based in part on determining that a predetermined amount of time has elapsed since the second audio signal was detected.

9. The method of claim 1, wherein determining that the interruption has ended is based in part on receiving an indication from a second device that the interruption has ended.

10. A system comprising:

memory;

control circuitry configured to:

detect, by a device executing an assistant application, a first audio signal of a first audio source, the first audio signal comprising a first query;

generate for output a first reply to the first query;

detect a second audio signal of a second audio source;

determine that the second audio signal is an interruption to the first audio signal by:

generating a first audio signature from the first audio signal;

generating a second audio signature from the second audio signal;

comparing the first audio signature to the second audio signature;

based on the comparing, determining whether the first audio signature matches the second audio signature; and determining that the first audio source is different than the second audio source based in part on determining that the first audio signature does not match the second audio signature;

determine that the second audio signal has been detected for at least a predetermined period of time within a time window;

based on determining that the second audio signal is an interruption to the first audio signal, refrain, by the device, from generating any output;

determine that the interruption has ended; and based on determining that the interruption has ended, end the refraining and generate for output a second reply, the second reply relating to at least one of the first query or the first reply.

11. The system of claim 10, wherein the control circuitry is further configured to:

access a database comprising a plurality of stored audio signatures; and compare the second audio signature to the plurality of stored audio signatures to determine a source type corresponding to the second audio signature;

wherein determining that the first audio source is different than the second audio source is further based in part on the source type corresponding to the second audio signature.

12. The system of claim 11, wherein the plurality of stored audio signatures comprises audio signatures associated with a plurality of users.

13. The system of claim 10, wherein determining that the second audio signal is an interruption to the first audio signal is based in part on receiving a communication from a second device.

14. The system of claim 10, wherein determining that the second audio signal is an interruption to the first audio signal is further based on determining that the second audio signal is a non-verbal audio signal comprising an amplitude exceeding a threshold level.

15. The system of claim 10, wherein determining that the second audio signal is an interruption to the first audio signal is further based on determining that the first audio source has moved to a distance from the device that exceeds a threshold distance.

16. The system of claim 15, wherein determining that the interruption has ended is based in part on determining that the first audio source has moved to within the threshold distance from the device.

17. The system of claim 10, wherein the control circuitry is further configured to:

store a timestamp associated with the detecting the second audio signal;

wherein determining that the interruption has ended is based in part on determining that a predetermined amount of time has elapsed since the second audio signal was detected.

18. The system of claim 10, wherein determining that the interruption has ended is based in part on receiving an indication from a second device that the interruption has ended.

* * * * *